United States Patent Office 2,820,778
Patented Jan. 21, 1958

2,820,778

PRODUCTION OF POLYMERIZATION PRODUCTS FROM OLEFINICALLY UNSATURATED HYDROCARBONS

Hermann Spaenig, Ludwigshafen (Rhine), and Hans Ruprecht Hensel, Heidelberg, Germany, assignors to Badische Anilin- & Soda-Fabrik Aktiengesellschaft, Ludwigshafen (Rhine), Germany No Drawing. Application December 27, 1956
Serial No. 630,757

Claims priority, application Germany December 28, 1955

20 Claims. (Cl. 260—94.3)

This invention relates to the production of polymerization products from olefinically unsaturated hydrocarbons in the presence of catalysts.

We have found that olefinically unsaturated hydrocarbons especially the olefines having up to about 8 carbon atoms and preferably with up to about 4 carbon atoms in the molecule, for example ethylene, propylene, butylene, isobutylene and diolefines, for instance butadiene and isoprene and mixtures thereof can be polymerized at low temperatures, as for example at room temperature and under normal pressure or moderately increased pressure, to solid, tough products by using as polymerization catalysts halogen-containing compounds of metals of the 4th to 6th sub-groups of the periodic system of elements together with compounds of the general formula

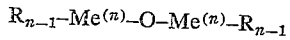

$$R_{n-1}-Me^{(n)}-O-Me^{(n)}-R_{n-1}$$

In the said formula Me is a metal of the 4th main group of the periodic system of elements, especially tin or lead and if desired also germanium. R is an alkyl radical, preferably saturated and if desired substituted, especially such a radical having up to about 6 carbon atoms. R may also be a cycloalkyl radical. $n$ is a number which indicates the valency of the metal and O is oxygen. Especially suitable compounds of this kind are for example hexa-ethyl distannoxane, hexabutyl distannoxane, hexahexyl distannoxane and hexacyclohexyl distannoxane. These oxygen-containing organic metal compounds are readily accessible. Hexa-alkyl distannoxanes can be prepared for example in the known manner from the corresponding trialkyl tin monochlorides by the action of aqueous alkalies and subsequent distillation, for example according to the process described by G. S. Sasin in J. Org. Chem. 18 (1953), 1142. The trialkyl tin chloride used for this purpose is obtained by reaction of a Grignard solution (prepared in known manner) with tin tetrachloride. It is better to allow an alkyl or cycloalkyl halide or a tin tetrahalide to act on magnesium and to hydrolyse the reaction product obtained with aqueous alkalies. It is preferable to use for this purpose a solution of a tin tetrahalide, especially tin tetrachloride or tin tetrabromide, in an indifferent solvent. Especially suitable solvents are aromatic hydrocarbons, as for example benzene or toluene. It is especially advantageous technically to use gaseous alkyl halides, as for example ethyl chloride, which when led into the reaction mixture, especially at elevated temperature, are immediately absorbed and reacted. It is also possible first to allow two of the reaction components to act on each other for a short time and then to add the third component. Other suitable alkyl halides are for example ethyl bromide or butyl chloride. As cyclo-aliphatic halides may be used for example cyclohexyl-chloride.

The molar ratio of magnesium to tin tetrahalide preferably amounts to about 3:1, but this ratio may also amount to about 4:1 to about 2.5:1. The organic halide is preferably used in excess with respect to the tin halide. The reaction proceeds especially rapidly at elevated temperature, for example between about 70° and 120° C., but when using solvents of lower or higher boiling point the said temperature range is not obligatory. When the reaction is over, the magnesium salts formed are filtered off by suction and the organic tin halide obtained is hydrolyzed with aqueous alkalies, as for example caustic soda solution, and then distilled. The hydrolysis of the halogen-containing organo-tin compound may take place even by shaking a solution of the same in an organic liquid with aqueous alkalies.

These oxygen-containing organometallic compounds are easy to handle, because in contrast to the aluminium alkyls they are insensitive to moisture and oxygen. The yield of polyolefines can be increased by using mixtures of the said oxygen-containing organometallic compounds with each other or with other organometallic compounds, as for example with trialkyl tin hydroxides and tetraalkyl tin compounds.

Especially suitable halogen-containing compounds of metals of the 4th to 6th sub-groups are for example the halides and especially the chlorides or bromides of the metals titanium, zirconium, hafnium, vanadium, niobium, tantalum, chromium, molybdenum or tungsten. Titanium tetrachloride, titanium trichloride, zirconium tetrabromide, hafnium tetrabromide, vanadium pentafluoride or vanadium tetrachloride are especially suitable. Furthermore there may often be used with good results compounds of the general formula $MeO_nX_p$ in which Me is again a metal of the 4th to 6th sub-groups, O is oxygen and X is a halogen, $n$ and $p$ being numbers which result from the valency of the metal. In general $n$ is 1 or 2 and $p$ is 1 to 4. Vanadium oxytrichloride is an example of such a compound. Mixtures of these metal halogen compounds may also be used.

Obviously it is also possible to polymerize in the presence of the proposed catalysts under increased pressure, for example up to 100 atmospheres or a higher pressure and preferably up to 30 atmospheres, but the polymerization of the olefines, especially of ethylene, proceeds even at normal pressure. In this case the oxygen-containing organometallic compound of a metal of the 4th main group is preferably dissolved in an indifferent solvent, the halogen compound of a metal of the 4th to 6th sub-groups is added and then the olefine is led in. A specially advantageous manner of operation consists in first saturating with an olefine at about 50° to 80° C. a solution of the organic compound of a metal of the 4th main group in an indifferent solvent and then adding a halogen compound of a metal of the 4th to 6th sub-groups. The polymerization then begins at once with clouding of the reaction mixture. After 3 to 4 hours, the contents of the reaction vessel consists of a thick pulp. By increasing the pressure, the yield of polymerization products can be increased by a multiple.

The polymerization reaction proceeds even at room temperature with sufficient speed. This may be increased, by heating moderately, for example to temperatures up to about 100° C. Obviously it is possible to polymerize at yet higher temperatures.

Suitable indifferent solvents are for example unsaturated or especially saturated aliphatic, cycloaliphatic and especially aromatic hydrocarbons, as for example hexane, cyclohexane, octane, gasoline or gasoline fractions, benzene, xylene or toluene. Chlorinated hydrocarbons, as for example carbon tetrachloride, are also suitable. Solvent mixtures, especially those of aromatic and aliphatic or cycloaliphatic hydrocarbons are especially favorable, for example those of about equal parts by weight of toluene and octane, toluene and dimethyl cyclohexane or benzene and carbon tetrachloride.

By the polymerization of ethylene according to the process proposed, there are obtained solid, tough initially grey-colored granular polymers which become pure white after washing, for example with organic solvents or dilute aqueous or organic solutions of acids. If the polymer be treated at once with a mixture of alcohols, for example methanol, and a mineral acid, for example concentrated hydrochloric acid, in the ratio 1:1 at 100° C., the ash content of the polymer can be reduced to less than 0.05 percent by weight. The molecular weight, determined according to Überreiter (Makromol. Chem. 8, 21, 1952) lies in the range of about 100,000 to more than 3 million, depending on the working conditions. The molecular weight may be strongly influenced especially by variation in the pressure and the relative proportions of oxygen-containing compound and if desired of tetraalkyl- or tetracycloalkyl compounds of a metal of the 4th main group and the halogen compound of a metal of the 4th to 6th sub-groups. An increase in the pressure causes an increase in the molecular weight, as does also the reduction of the fraction of the halogen compound of a metal of the 4th to 6th sub-groups in the catalyst mixture. In general about 1 to 3 mols and preferably about 1 to 2 mols of a compound of a metal of the 4th main group are used together with 1 mol of a halogen compound of a metal of the 4th to 6th sub-groups. If a tetraalkyl- or tetracycloalkyl compound of a metal of the 4th main group is added, 1 mol of such a compound may be used together with 1 mol of a compound of the general formula $R_{n-1}—Me^{(n)}—O—Me^{(n)}—R_{n-1}$ and 1 mol of a halogen compound of a metal of the 4th to 6th sub-groups. Of the catalyst mixture there are in general used about 1 to 2 percent with reference to the suspension liquid.

By boiling with 30 to 40 percent nitric acid, the high molecular weight polymers can be converted without waste into products of lower molecular weight of any desired molecular weight. Furthermore the products obtained can be worked up by all the methods known for olefine polymers. They may serve for example for the production of injection moldings, foils, films and also technical fibres and threads.

The following examples will further illustrate this invention but the invention is not restricted to these examples. The parts specified in the examples are parts by weight.

Example 1

A solution of 864 parts of ethyl bromide in 1000 parts of benzene and a solution of 650 parts of tin tetrachloride in 1500 parts of benzene are allowed to flow separately into 192 parts of magnesium chips, which have been activated with 20 parts of ether and a trace of iodine, during the course of 2 hours at such a speed that the mixture boils under reflux. After boiling for 12 hours, the magnesium salts formed are filtered off by suction, the salt residue is washed with 300 parts of benzene and the benzene solutions are then shaken with 1000 parts of 2-normal caustic soda solution. After distilling off the benzene, an oil is obtained which may be split up by distillation into the following fractions: boiling point at 18 Torr., 75° to 80° C.; tetraethyl tin, 40 parts; boiling point at 17 Torr., 145° to 147° C.; hexaethyl distannoxane, 220 parts.

The hexaethyl distannoxane has the formula:

$$((C_2H_5)_3Sn)_2O$$

It is a highly refractive colorless liquid ($n_D^{20}$ 1.4990, 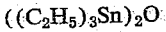 1.3872).

With water the compound is converted into the solid triethyl tin hydroxide of the melting point 44° C. This splits off water again even over phosphorus pentoxide and thereby yields hexaethyl distannoxane again.

Example 2

A solution, warmed to 60° C., of 4 parts of hexaethyl distannoxane in 250 parts of benzene and 250 parts of octane is saturated with ethylene and then 4 parts of titanium tetrachloride are added. The polymerization commences at once with clouding of the reaction mixture and is ended after 3 to 4 hours. The granular polymer is filtered off by suction and stirred with 3 percent hydrochloric acid at room temperature. 40 parts of polyethylene with the melting point 135° to 137° C. are obtained. The filtrate contains 5 parts of oily paraffin hydrocarbons.

Example 3

Ethylene is polymerized as described in Example 2 with the aid of 4 parts of hexaethyl distannoxane, 4 parts of tetraethyl tin and 3 parts of titanium tetrachloride in 250 parts of benzene and 250 parts of octane. 55 parts of polyethylene of the melting point 138° to 140° C. are obtained.

By using 4 parts of hexabutyldistannoxane, 3 parts of tetraethyl tin and 3 parts of titanium tetrachloride in 250 parts of benzene and 250 parts of octane, 45 parts of polyethylene with the melting point 134° to 137° C. are obtained.

Example 4

Ethylene is polymerized according to Example 2 with 4 parts of hexaethyl distannoxane, 3 parts of tetraethyl tin and 2 parts of titanium tetrachloride in 500 parts of carbon tetrachloride. 45 parts of polyethylene with the melting point 135° to 137° C. are obtained.

Example 5

Ethylene is led at a temperature of 50° to 65° C. into a suspension of 6 parts of hexabutyl distannoxane, 6 parts of tetraethyl tin and 4 parts of titanium tetrachloride in 1000 parts of toluene. After 3 to 4 hours, the brown to grey colored polymer is filtered off by suction and boiled for an hour with a mixture of 500 parts each of methanol and concentrated hydrochloric acid. It thereby becomes pure white. After washing and drying, 70 parts of polyethylene are obtained having the following properties: melting point 134° to 135° C., ash content less than 0.05 percent, molecular weight 300,000, tensile strength 235 kilograms per square centimetre, tenacity 244 kilograms per square centimetre, extension 564 percent, density 0.9538.

Example 6

Ethylene is polymerized according to Example 5 with 6 parts of hexabutyl distannoxane, 6 parts of tetraethyl tin, and 12 parts of titanium tetrachloride. 75 parts of polyethylene of the molecular weight 200,000, melting point 134° to 135° C., ash content less than 0.05 percent, tensile strength 243 kilograms per square centimetre, tenacity 274 kilograms per square centimetre, extension 610 percent and density 0.9557 are obtained.

Example 7

Ethylene is polymerized according to Example 5 with 6 parts of hexabutyl distannoxane, 6 parts of tetraethyl tin and 20 parts of titanium tetrachloride. 50 parts of polyethylene are obtained having the molecular weight 145,000, melting point 134° to 135° C. and ash content less than 0.05 percent.

Example 8

1000 parts of toluene, 3 parts of tin tetraethyl, 4 parts of hexabutyl distannoxane and 4 parts of titanium tetrachloride are charged into a pressure vessel having stirring means and ethylene is repeatedly forced in at a temperature of 50° to 60° C. up to a pressure of 10 excess atmospheres. After working up according to Example 4, 150 parts of polyethylene of the molecular weight 1,200,000 are obtained. The melting point is 136° to 137° C. and the ash content less than 0.05 percent.

Example 9

Ethylene is polymerized according to Example 8 with 3 parts of tin tetraethyl, 4 parts of hexaethyl distannoxane and 6 parts of vanadium tetrachloride at 20 excess atmospheres. 100 parts of polyethylene are obtained having the molecular weight 2,500,000, melting point 136° to 137° C. and ash content less than 0.05 percent.

Example 10

Ethylene is polymerized according to Example 8 with the same amount of catalyst and at a pressure of 20 excess atmospheres. 250 parts of polyethylene are obtained having the molecular weight 3,200,000, melting point 137° to 139° C., and ash content less than 0.05 percent.

Example 11

Butadiene is polymerized according to Example 8 at 20 excess atmospheres with 5 parts of tin tetraethyl, 3 parts of hexaethyl distannoxane and 6 parts of titanium tetrachloride. 90 parts of polybutadiene are obtained with a molecular weight of more than 3 million. The melting point is 135° to 136° C. and the ash content 0.18 percent.

Example 12

Butadiene is polymerized according to Example 8 at 20 atmospheres excess with 6 parts of tin tetraethyl, 3 parts of hexabutyl distannoxane and 8 parts of vanadium tetrachloride. 130 parts of polybutadiene are obtained with a molecular weight of more than 2 million. The melting point is 138° to 139° C. and the ash content 0.08 percent.

We claim:

1. A process for the production of polymerization products from olefinically unsaturated hydrocarbons, which comprises polymerizing these with the aid of a mixture of a halogen-containing compound of a metal of the 4th to 6th sub-groups of the periodic system of elements with a compound of the general formula $$R_{n-1}-Me^{(n)}-O-Me^{(n)}-R_{n-1}$$

in which Me is a metal of the 4th main group of the periodic system of elements, R is a hydrocarbon radical, O is oxygen and $n$ is a whole number which results from the valency of the metal.

2. A process as claimed in claim 1 wherein olefines having up to 4 carbon atoms in the molecule are polymerized.

3. A process according to claim 1 in which the corresponding tin compound is used as the compound of the said general formula.

4. A process as claimed in claim 1 wherein the corresponding lead compound is used as the compound of the said general formula.

5. A process as claimed in claim 1 wherein a compound of the said general formula is used in which R is an alkyl radical, preferably saturated, having up to 6 carbon atoms.

6. A process as claimed in claim 1 wherein the halogen compound of a metal of the 4th to 6th sub-groups of the periodic system of elements is a halide of said metal.

7. A process as claimed in claim 1 wherein the compound of a metal of the 4th to 6th groups of the periodic system is a compound of the general formula $MeO_nX_p$ in which Me is a metal of the 4th to 6th sub-groups, O is oxygen, X is a halogen, $n$ is a whole number from 1 to 2 and $p$ is a whole number from 1 to 4.

8. A process as claimed in claim 6 wherein titanium tetrachloride is used.

9. A process as claimed in claim 6 wherein vanadium tetrachloride is used.

10. A process as claimed in claim 1 wherein the polymerization is effected under increased pressure.

11. A process as claimed in claim 1 wherein the polymerization is effected under atmospheric pressure.

12. A process as claimed in claim 10 wherein the pressure used is up to about 100 atmospheres.

13. A process as claimed in claim 10 wherein the pressure used is up to about 30 atmospheres.

14. A process as claimed in claim 1 wherein the polymerization is carried out in the presence of an indifferent organic solvent.

15. A process as claimed in claim 1 wherein the polymerization is carried out at room temperature.

16. A process as claimed in claim 1 wherein the polymerization is carried out at elevated temperature.

17. A process as claimed in claim 16 wherein the polymerization is carried out at a temperature up to about 100° C.

18. A process for the production of polymerization products from olefinically unsaturated hydrocarbons which comprises carrying out the polymerization in the presence of a mixture of about 1 to 2 mols of a compound of the general formula $$R_{n-1}-Me^{(n)}-O-Me^{(n)}-R_{n-1}$$

in which Me is a metal of the 4th main group of the periodic system of elements, R is hydrocarbon radical, O is oxygen and $n$ is a number which results from the valency of the metal, and about 1 mol of a halogen compound of a metal of the 4th to 6th sub-groups of the periodic system of elements.

19. A process as claimed in claim 1 wherein 1 mol of a compound of the general formula $$R_{n-1}-Me^{(n)}-O-Me^{(n)}-R_{n-1}$$

is used together with 1 mol of a corresponding tetraalkyl compound and 1 mol of a halogen compound of a metal of the 4th to 6th sub-groups of the periodic system of elements.

20. A process as claimed in claim 1 wherein 1 mol of a compound of the general formula $$R_{n-1}-Me^{(n)}-O-Me^{(n)}-R_{n-1}$$

is used together with 1 mol of a corresponding tetracycloalkyl compound and 1 mol of a halogen compound of a metal of the 4th to 6th sub-groups of the periodic system of elements.

References Cited in the file of this patent

UNITED STATES PATENTS 2,491,116    Kraus et al. _____ Dec. 13, 1949